Jan. 15, 1957 F. A. COWAN 2,777,900
REDUCTION OF QUADRATURE DISTORTION
Filed Dec. 30, 1952
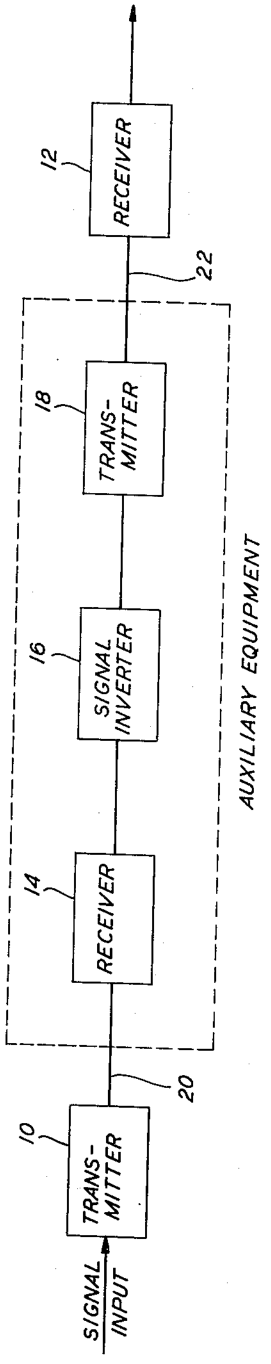
INVENTOR
F. A. COWAN
BY George C. Lord
ATTORNEY United States Patent Office 2,777,900

Patented Jan. 15, 1957

2,777,900

REDUCTION OF QUADRATURE DISTORTION

Frank Augustus Cowan, New York, N. Y., assignor to American Telephone and Telegraph Company, a corporation of New York Application December 30, 1952, Serial No. 328,785

5 Claims. (Cl. 179—15.5)

This invention relates to vestigial sideband systems and more particularly to apparatus and methods for the reduction of quadrature distortion in systems of this general type employing envelope detection.

Vestigial sideband transmission has found considerable application for the transmission of message intelligence in those cases in which the message wave includes very low frequencies or direct-current components. Such signals are encountered in picture transmission devices and particularly in television systems. As is well known the vestigial sideband method of transmission involves the application of the carrier modulated by the message wave to shaping circuits included in the transmitter or receiver or both which act to suppress the majority of one of the two sidebands produced by the modulation process and in most cases to modify the transmission of the other sideband at frequencies near the carrier frequency. Various shaping characteristics have been employed but it has been found desirable to so arrange the shaping circuit as to modify the transmission of the wanted sideband in the immediate vicinity of the carrier frequency in such a way as to be complementary to the transmission of the unwanted sideband at an equal distance (in frequency) from the carrier. Whenever such shaping is employed certain distortions are introduced into the signal which is ultimately transmitted to the receiver. The primary distortion is due to the so-called quadrature component which may be considered to comprise a carrier, the phase of which is shifted 90 degrees from the applied carrier (in-phase carrier), which is modulated by the message information also shifted in phase and amplitude from the corresponding message signal components appearing in the modulation of the in-phase carrier. The presence of this quadrature component in a transmitted wave causes distortion in the shape of the message wave recovered at the receiver and such distortion is highly undesirable in picture and television transmission systems.

Various arrangements have been proposed for reducing or eliminating such quadrature distortion in vestigial sideband systems. It has been found, for example, that if the transmitted wave is detected by a homodyne detector, and the local carrier supply for it is phased to correspond with the applied carrier, the quadrature component may be substantially eliminated. No such expedient exists where for one reason or another it is desirable to receive the transmitted wave by envelope detection, although it has been known to reduce the effect of the component by exalting or increasing the amplitude of the carrier employed at the transmitter or by transmitting a larger portion (frequency-wise) of the unwanted sideband. Such reductions in distortion are, however, accompanied by an undesirable reduction in the efficiency or an increase in the required bandwidth of the transmission system.

It is the object of the present invention to reduce the undesirable effects of quadrature distortion in vestigial sideband systems employing envelope detection without resort to the methods considered above.

In accordance with the present invention quadrature distortion is reduced in a vestigial sideband system employing envelope detection by interposing certain auxiliary apparatus between either the transmitter or the receiver and the transmission channel extending between them. Such apparatus includes an auxiliary receiver having characteristics similar to those of the receiver of the transmission system, a circuit for inverting the output of the auxiliary receiver and an auxiliary transmitter arranged to receive the inverted output of the auxiliary receiver and having characteristics similar to those of the transmitter of the transmission system. The output of the auxiliary receiver is a representation of the modulating wave as distorted by the quadrature effect. This is inverted and employed as a predistorted input wave for the auxiliary transmitter and serves therein to modulate a new carrier having the same frequency as that employed in the main transmitter. It has been found that the arrangement of the invention acts substantially to reduce quadrature distortion.

The above and other features of the invention will be described in detail in the following specification taken in connection with the drawing, the single figure of which is a block diagram of a vestigial sideband system embodying the invention.

As shown in the drawing a vestigial sideband transmission system may include a terminal transmitter 10 and a terminal receiver 12 joined by a transmission path which may comprise a radio channel or a wire facility. The terminal transmitter 10 is arranged to accept a modulating or message wave and both to modulate this wave upon a suitable carrier wave and also to subject the modulated carrier wave to shaping in accordance with a desired vestigial sideband characteristic. The choice of the characteristic to be employed depends upon many factors including the efficiency of the system, its bandwidth, the maximum reduction of quadrature distortion consistent with minimum distortion of the desired in-phase signal, and others.

In general, however, the amount of quadrature distortion introduced by shaping for the purpose of obtaining a vestigial sideband signal varies directly with the extent of departure from a true double sideband signal. The sharper the cut-off in the transmission characteristic in the area of the carrier, the greater the distortion. In a typical system, however, the shaping characteristic might be such as to provide a transmission of one unit at the carrier frequency, a transmission of two units in one sideband for all frequency values removed by a value $+f$ from the carrier and a transmission of zero for all components falling in the other sideband and removed from the carrier by an amount equal to $-f$, the transmission increasing linearly between $-f$ and $+f$. Such a characteristic represents an idealized compromise among various other requirements and introduces relatively small but nevertheless undesirable amounts of quadrature distortion. It can be shown, for example, that in a system comprising only the terminal transmitter 10, the transmission path and a terminal receiver 12 in which envelope detection is employed, the result of applying to the modulator at the transmitter a carrier C and a message signal P is the production of a demodulated output signal at the receiver of the following form:

$$\sqrt{(C+P)^2+Q^2} \quad (1)$$

in which the quantity Q represents the quadrature component and is a distortion of the message signal P applied at the transmitter.

In accordance with the present invention an auxiliary receiver 14, a signal inverter 16, and an auxiliary transmitter 18 are connected in the circuit between the transmission path and either terminal transmitter 10 or terminal receiver 12. In the former arrangement, connection 20 is an internal connection at the transmitting terminal and connection 22 represents the transmission path. In the alternative arrangement connection 20 is the transmission path, and connection 22 is an internal connection at the receiving terminal. Receiver 14 may be identical to terminal receiver 12 and in any event must have substantially the same transmission characteristics as receiver 12. Thus receiver 14 employs envelope detection and contains whatever frequency restrictive circuits are employed in terminal receiver 12. The output of receiver 14 will then be understood to be identical to that which would have been produced by terminal receiver 12 had not the additional elements 14, 16 and 18 been inserted in the system. This output will, in general, be a distorted representation of the input wave applied to transmitter 10 in which the primary distortion will be due to the presence of the undesired quadrature component. Expression 1 given above as well as experimental observations of working systems indicate that the effect of such quadrature component is always to increase the amplitude of the modulated carrier wave envelope, although not in any regular manner. According to the invention, therefore, the output of receiver 14 is inverted in signal inverter 16 which may be of any convenient form but may, for example, comprise merely a vacuum tube amplifier introducing a phase reversal in the usual manner. This inverted signal is employed as the modulating wave for a second transmitter 18 in which it is modulated upon a carrier C′.

Transmitter 18 is arranged to present the same transmission characteristics as terminal transmitter 10 and employs the same shaping circuits. While carrier C′ employed in transmitter 18 is of the same frequency as the carrier C employed in transmitter 10, its amplitude is chosen in such a way that $$C' > (C+P) \qquad (2)$$

the result of these operations is the application to transmitter 18 as a modulating wave of a signal of the following form:

$$-\sqrt{(C+P)^2+Q^2} \qquad (3)$$

rather than merely P. When this signal, which will be recognized as the demodulated output of the unmodified system, is subjected to the vestigial sideband shaping circuits an undesired quadrature component will be produced. The output of transmitter 18 including both the in-phase component resulting from the modified modulating wave and the undesired quadrature component is transmitted to terminal receiver 12 and then subjected to envelope detection. It can be shown that the output of the detector of terminal receiver 12 is of the following form:

$$\sqrt{[(C'-C)-P]^2-\frac{[(C'-C)-P]Q^2}{(C+P)}+\frac{Q^4}{4(C+P)^2}+Q^2-2QQ'+Q'^2} \qquad (4)$$

It will be noted that this output contains terms in $Q^2$ which are of opposite sign and also includes terms in $Q^4$, $QQ'$ and $Q'^2$. When Q, the primary quadrature distortion is small as compared with the in-phase component as discussed above, Q′, the quadrature distortion arising in the passage of the quantity Q in the predistorted wave through the second transmitter-receiver combination, will be smaller than Q. It follows that the $QQ'$ term will be small as compared with the terms in $Q^2$ as will the $Q'^2$ term. The 4th power term, being essentially the square of the fractional term in $Q^2$ will also be of less magnitude. It will be noted, therefore, that for characteristics producing relatively small values of Q, quadrature distortion is reduced by virtue of the operations performed upon the signal in accordance with the invention. The additional terms referred to above as being introduced by these operations are of such relatively small amplitudes as not materially to detract from the reduction of quadrature distortion afforded by the partial cancellation of the terms in $Q^2$.

It will be recognized that the operations performed according to the invention result in phase inversion of the message signal. If such inversion is undesirable, it can be corrected by well known means, as for example, by passing the demodulated output of the terminal receiver through a single stage vacuum tube amplifier similar to the signal inverter referred to above.

What is claimed is:

1. In a vestigial sideband system, a main transmitter for producing vestigial sideband signals in response to a modulating wave, a main receiver including an envelope detector for recovering said wave from said signals, and a circuit interconnecting said main transmitter and receiver and including a transmission path and a distortion reduction system connected in tandem, said distortion reduction system comprising an auxiliary receiver having transmission characteristics similar to those of said main receiver, a phase inverter connected to the output of said auxiliary receiver, and an auxiliary transmitter connected to the output of said phase inverter and having characteristics similar to those of said main transmitter.

2. In a vestigial sideband system, a main transmitter for producing vestigial sideband signals in response to a molulating wave, a main receiver including an envelope detector for recovering said wave from said signals, and a circuit interconnecting said main transmitter and receiver and including a transmission path and means for predistorting the wave applied to said main receiver to compensate for quadrature distortion, otherwise produced by said main transmitter and receiver, comprising means for deriving from the output wave from said main transmitter a replica of the distorted output wave otherwise produced by said main receiver, means for inverting said replica and means having the same distorting effect as said main transmitter for applying said inverted replica to said main receiver.

3. In a vestigial sideband system, a source of modulating waves, a transmitter for producing vestigial sideband signals in response to an applied modulating wave, a receiver joined thereto by a transmission path and including an envelope detector for recovering the modulated wave from said signals, and means for providing in response to the output of said transmitter a signal wave for application to said transmission path which is predistorted to compensate for distortion otherwise introduced by said transmitter and receiver comprising an auxiliary transmitter having characteristics similar to those of said transmitter, a signal inverter and an auxiliary receiver having characteristics similar to those of said receiver connected in tandem between said transmitter and said transmission path.

4. In a vestigial sideband system, a source of modulating waves, a main transmitter for producing vestigial sideband signals in response to a message wave to be transmitted and a main receiver including an envelope detector for recovering said message wave from said signals, a transmission path joining said main transmitter and main receiver, and means connected in tandem between said transmission path and said main receiver for providing in response to the vestigial sideband signal produced by said main transmitter a vestigial sideband signal for application to said main receiver predistorted to compensate for distortion otherwise introduced by said main transmitter and main receiver and comprising an auxiliary receiver having characteristics similar to those of said main receiver, a circuit for inverting the output of said auxiliary receiver and an auxiliary transmitter having characteristics similar to those of said main transmitter and arranged to accept the output of said inverting circuit and to produce an output for application to said main receiver.

5. In a vestigial sideband system a transmitting terminal for producing vestigial sideband signal in response to a wave to be transmitted, a receiving terminal including an envelope detector for recovering said wave from said signals, a transmission channel joining said terminals, and means for reducing quadrature distortion in the recovered wave comprising an auxiliary receiver having characteristics similar to those of said receiving terminal, a signal inverter and an auxiliary transmitter having characteristics similar to those of said transmitting terminal connected in tandem between said transmission channel and one of said terminals.

References Cited in the file of this patent

UNITED STATES PATENTS

| | | |
|---|---|---|
| 1,913,551 | Hotopp | June 13, 1933 |
| 2,516,587 | Peterson | July 25, 1950 |
| 2,566,698 | Fredendall | Sept. 4, 1951 |